United States Patent [19]

Faigle et al.

[11] Patent Number: 5,340,148
[45] Date of Patent: Aug. 23, 1994

[54] AIR BAG INFLATOR WITH COMPOSITE STORED GAS CONTAINER

[75] Inventors: Ernst M. Faigle, Imlay City; Tracy S. Sparks, Lapeer; Richard J. Thompson, Imlay City; Brian K. Blackburn, Rochester, all of Mich.

[73] Assignee: TRW Vehicle Safety Systems Inc., Lyndhurst, Ohio

[21] Appl. No.: 147,669

[22] Filed: Nov. 3, 1993

[51] Int. Cl.$^5$ ............................................. B60R 21/22
[52] U.S. Cl. .................................. 280/730 A; 280/737; 180/274
[58] Field of Search ............... 280/730 R, 730 A, 737, 280/741; 180/274

[56] References Cited

U.S. PATENT DOCUMENTS

| | | | |
|---|---|---|---|
| 3,429,583 | 2/1969 | Martin et al. ........................ | 280/737 |
| 3,528,681 | 9/1970 | Ekstrom ............................... | 280/737 |
| 3,539,199 | 11/1970 | Ekstrom ............................... | 280/737 |
| 3,749,282 | 7/1973 | Day et al. ............................ | 280/737 |
| 3,883,156 | 5/1975 | Frazier ................................. | 180/274 |
| 3,922,002 | 11/1975 | Lindbert et al. ................... | 180/274 |
| 4,966,388 | 10/1990 | Warner et al. ..................... | 280/730 A |
| 5,060,470 | 10/1991 | Van Name .......................... | 60/253 |
| 5,152,550 | 10/1992 | Hoagland et al. ................. | 280/737 |
| 5,211,306 | 5/1993 | Delonge-Immik et al. ........ | 220/588 |
| 5,224,733 | 7/1993 | Simsic ................................. | 280/730 A |

OTHER PUBLICATIONS

Faigle, et al., "Weight-Reducing Composites for Auto Air Bag Inflators", Plastics Engineering, vol. 48, No. 11, Nov. 1992, pp. 25-27.

*Primary Examiner*—Kenneth R. Rice
*Attorney, Agent, or Firm*—Tarolli, Sundheim & Covell

[57] ABSTRACT

An apparatus (10) for inflating a vehicle occupant restraint such as an air bag (32) includes a container (30). The container (30) includes a liner (96) and a composite material (100) encasing the liner (96). A gas (94) is stored under pressure in the container (30) and, when released from the container, inflates the vehicle occupant restraint (32). The apparatus (10) includes opener means (180) for opening the container (30) by rupturing the composite material (100) and the liner (96) to release the gas (94) from the container (30). The liner, when ruptured, produces liner fragments (200). The composite material (100) inhibits separation of the liner fragments (200) from the container (30).

19 Claims, 5 Drawing Sheets

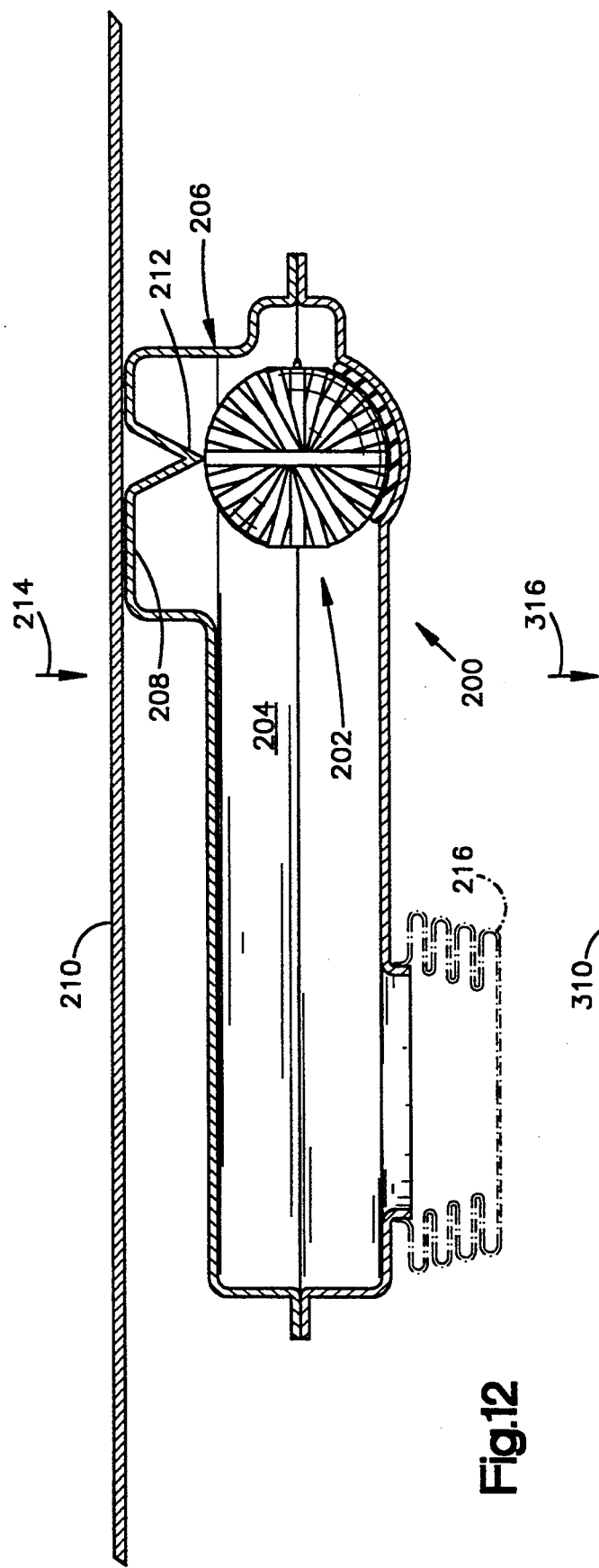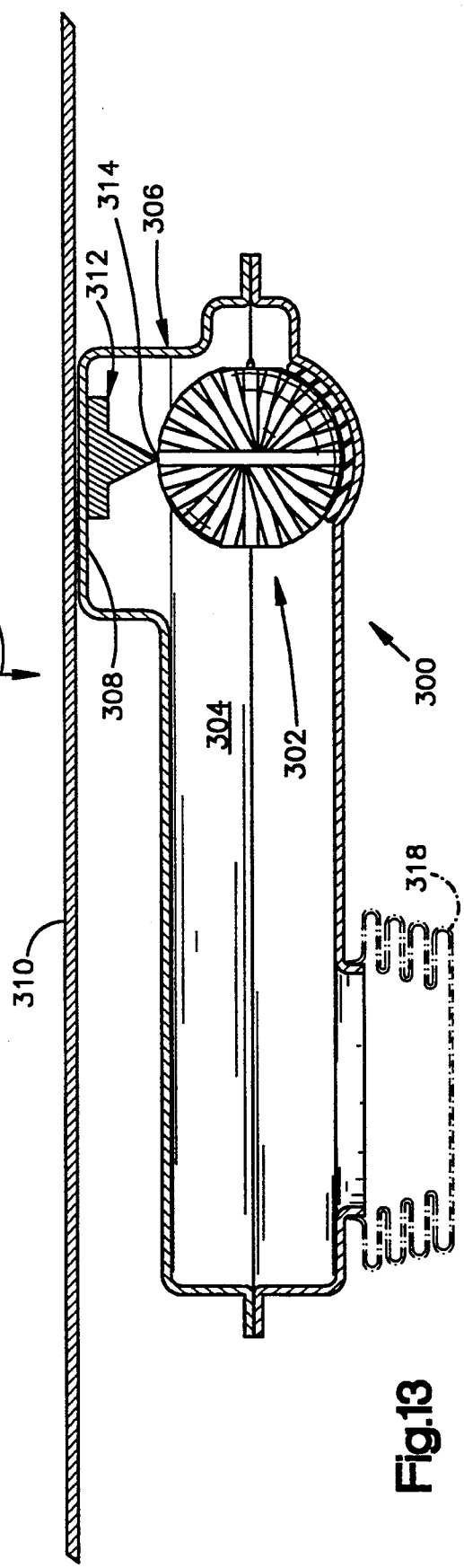
Fig.12
Fig.13

5,340,148

AIR BAG INFLATOR WITH COMPOSITE STORED GAS CONTAINER

BACKGROUND OF THE INVENTION

1. Technical Field

The present invention relates to an apparatus for protecting an occupant of a vehicle in the event of a collision or the like. The present invention is directed particularly to an air bag inflator having a stored gas container made of a composite material.

2. Description of the Prior Art

It is known to use an inflatable air bag to protect an occupant of a vehicle in the event of a collision or the like. In some systems, the air bag is inflated by a gas stored under pressure in a container. In the event of sudden vehicle deceleration and/or a side impact to the vehicle, for example, the gas is released from the container and directed into the air bag to inflate the air bag to restrain movement of the vehicle occupant.

It is known to use a detonator to rupture a stored gas container to form an opening in a wall of the container. When this is done, the portion of the container wall which is broken open may be broken into small fragments. These fragments may undesirably be drawn into the gas flowing from the container. It is known to place filter material between a container and an air bag to trap such fragments.

SUMMARY OF THE INVENTION

The present invention is an apparatus for inflating a vehicle occupant restraint such as an air bag. The apparatus includes containing means for containing an inflation fluid under pressure. The containing means comprises a liner and a composite material encasing the liner. The inflation fluid under pressure in the containing means, when released from the containing means, inflates the vehicle occupant restraint. The apparatus also includes directing means for directing the inflation fluid, when released from the containing means, to the vehicle occupant restraint to inflate the vehicle occupant restraint. The apparatus further includes opener means for opening the containing means by rupturing the composite material and the liner to release the inflation fluid from the containing means. The liner, when ruptured, produces liner fragments. The composite material comprises means for inhibiting separation of the liner fragments from the containing means.

The present invention is also a method of inflating a vehicle occupant restraint such as an air bag. The method comprises the steps of: providing an inflation fluid under pressure in a chamber defined by a liner encased by a composite material; opening the container by rupturing the composite material and the liner to release the inflation fluid from the container, the liner when ruptured producing liner fragments; inhibiting separation of the liner fragments from the container by the composite material; and directing the flow of inflation fluid from the container into the vehicle occupant restraint to inflate the vehicle occupant restraint.

In a second embodiment of the invention, the inflation fluid container is ruptured by a housing portion in response to crushing of the door of the vehicle. The container is of the same construction as the container in the first embodiment, and the composite material of the container inhibits separation of fragments of the container upon rupturing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 12 illustrates schematically an air bag inflator assembly in accordance with a second embodiment of the invention; and.

FIG. 13 illustrates schematically an air bag inflator assembly in accordance with a third embodiment of the invention.

DESCRIPTION OF PREFERRED EMBODIMENTS

Figure 1:
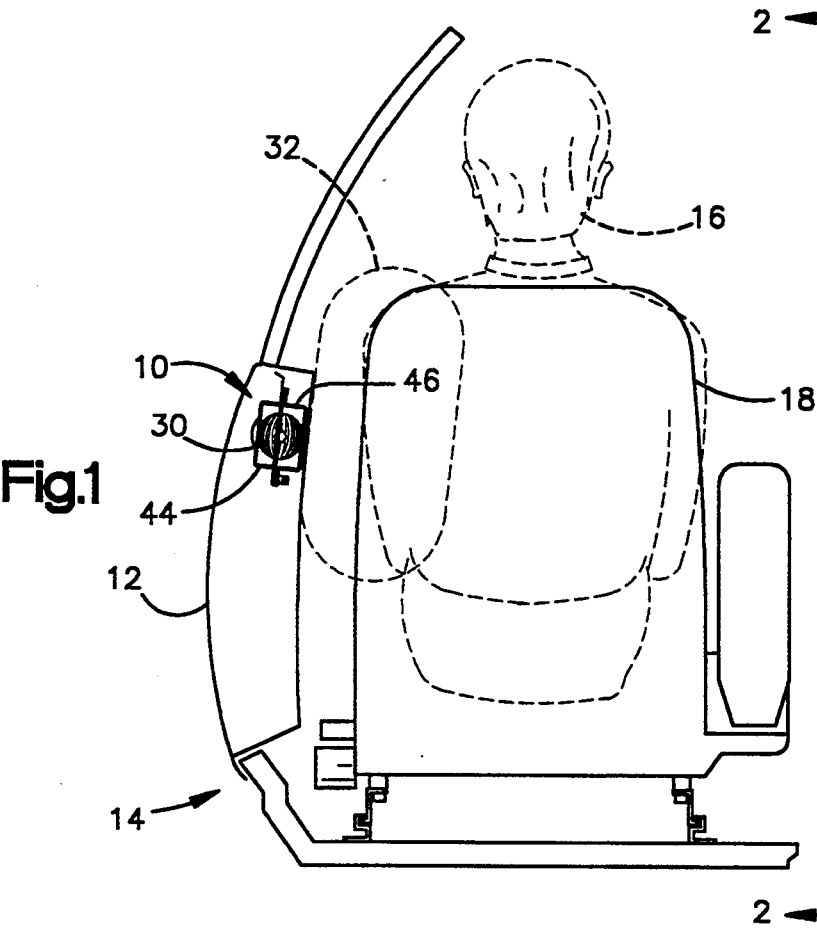
FIG. 1 is a schematic illustration of a vehicle showing a door-mounted air bag module with a stored gas container in accordance with the present invention and showing an air bag in its deployed condition.

The present invention relates to an apparatus and method for restraining movement of a vehicle occupant during a collision or the like. The present invention relates particularly to an inflator for inflating an air bag to protect an occupant of a vehicle during a collision. The present invention is applicable to various inflator constructions. As representative of the present invention, FIG. 1 illustrates a vehicle occupant restraint module 10.

Figure 2:
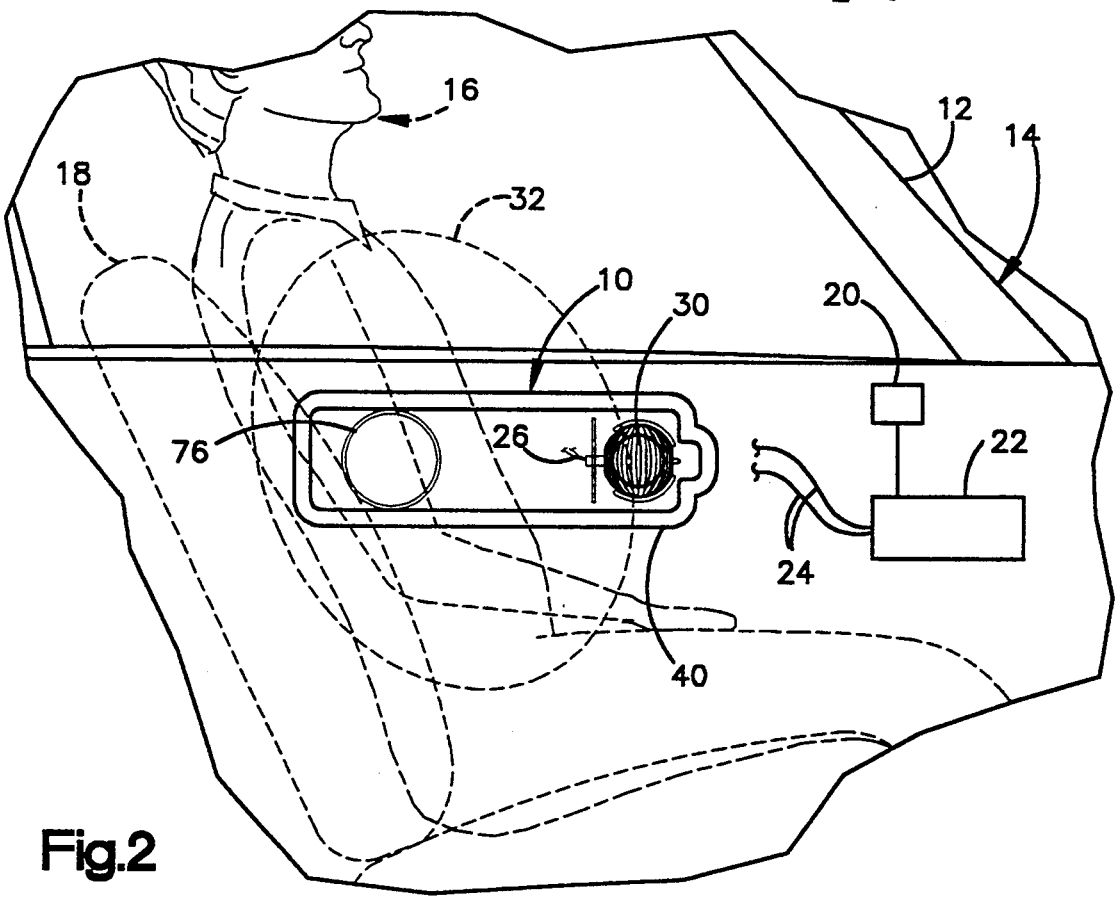
FIG. 2 is a schematic illustration taken in the direction of line 2—2 of FIG. 1.

The module 10 is mounted in a door 12 of a vehicle 14. As illustrated in FIGS. 1 and 2, a vehicle occupant 16 is seated in a vehicle seat 18. A vehicle side impact sensor indicated schematically at 20 is electrically connected with vehicle circuitry 22 which may include a computer. Lead wires 24 extend from the vehicle circuitry 22 and are connected in a manner not shown with lead wires 26 in the air bag module 10. The module 10 also includes a container 30 containing stored inflation fluid and an air bag 32, shown schematically in a deployed condition in FIGS. 1 and 2.

The module 10 (FIGS. 3 and 4) includes an elongate housing 40 with a longitudinal central axis 42. The housing 40 includes an outer shell 44 secured to an inner shell 46. The outer shell 44 (FIG. 1) is disposed closer to the outer skin of the vehicle door 12, and the inner shell 46 is disposed closer to the vehicle occupant 16.

Figure 3:
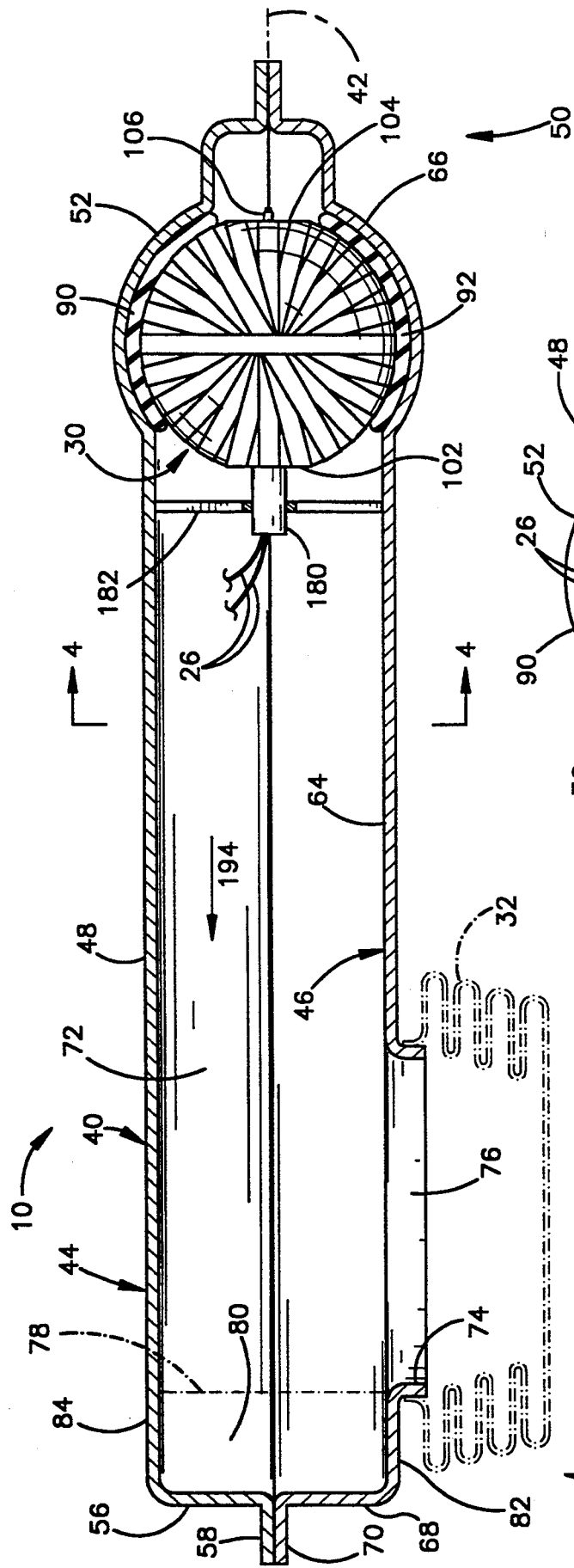
FIG. 3 is a longitudinal sectional view of the module of FIG. 1.
Figure 4:
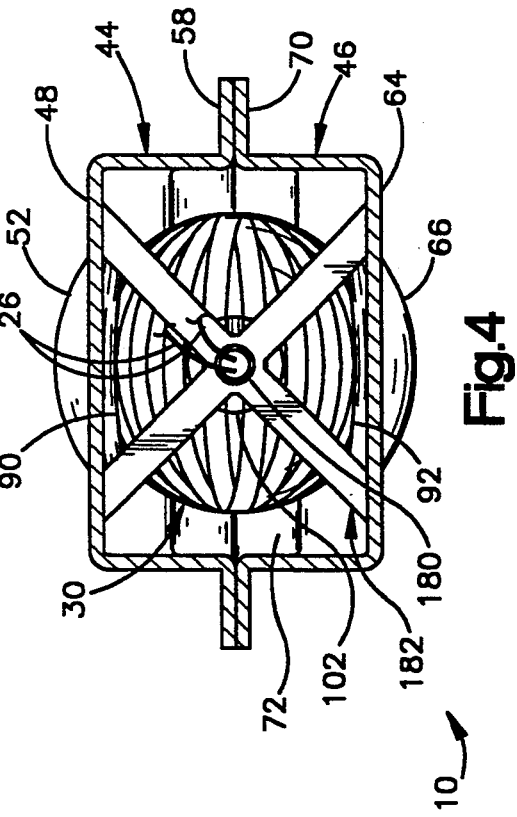
FIG. 4 is a transverse sectional view of the module taken along line 4—4 of FIG. 3.
Figure 5:
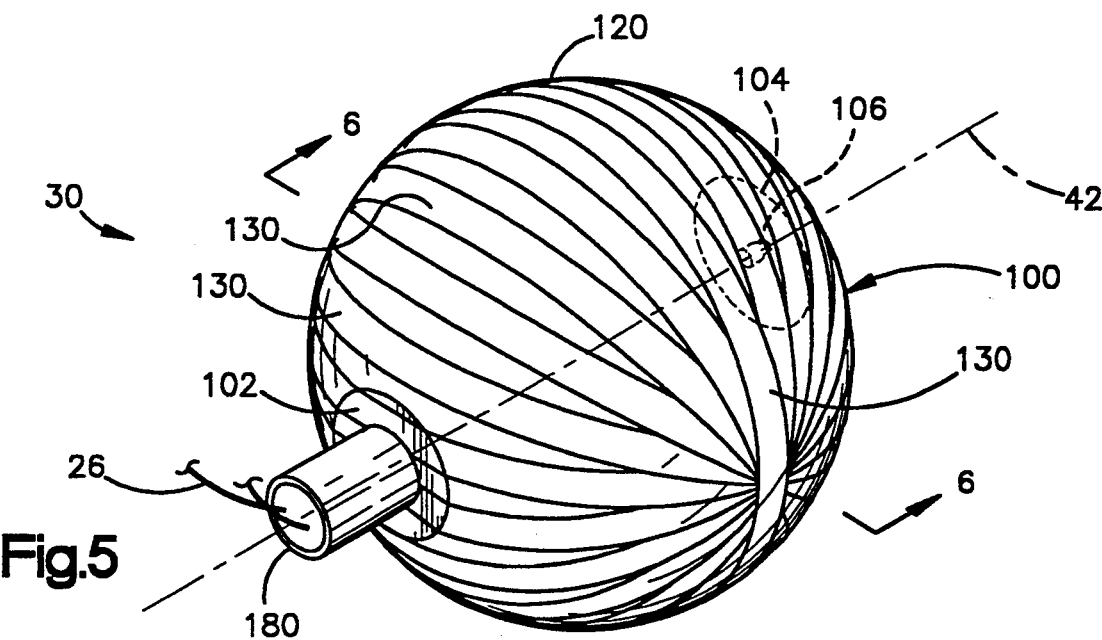
FIG. 5 is a perspective view of the stored gas container in FIG. 1.

The housing outer shell 44 (FIG. 3) has an axially central wall portion 48 with a generally rectangular cross-sectional configuration as best seen in FIG. 4. The outer shell 44 has a spherical wall portion 52 near one axial end 50 of the housing 40. At the opposite axial end 54 of the housing 40 the outer shell 44 includes a rectangular end wall 56. The outer shell 44 has a flange 58 extending around the entire periphery of the outer shell.

The housing inner shell 46 is substantially a mirror image of the outer shell 44. The inner shell 46 includes a an axially central wall portion 64 having a generally rectangular cross-sectional configuration. A spherical wall portion 66 of the inner shell 46 is aligned with the spherical wall portion 52 of the outer shell 44. A rectangular end wall 68 of the inner shell 46 is aligned with the outer shell end wall 56. A peripheral flange 70 of the inner shell 46 is secured to the outer shell flange 58 in a suitable manner such as by welding. The outer shell 44 and the inner shell 46 define between them an inflation fluid chamber 72 in the housing 40.

The inner shell 46 includes a circular wall portion 74 which projects from the central wall portion 64 in a direction away from the chamber 72. The circular wall portion 74 defines an opening 76 in the inner shell 46. The air bag 32 is secured to the inner shell 46, around the opening 76, in a suitable known manner. The interior of the air bag 32 is thus in fluid communication with the inflation fluid chamber 72. The air bag 32 is shown schematically in a deflated condition in FIG. 3.

A portion of the cheer 72 to the left (as viewed in FIG. 3) of an imaginary line 78 froms an inertial particle trap 80 at the module end 54. The inertial particle trap 80 is defined generally by an end portion 82 of the inner shell wall portion 64 which is disposed axially to the left (as viewed in FIG. 3) of the opening 76, by the end walls 68 and 56, and by an end portion 84 of the outer shell wall portion 48 which is axially coextensive with the inner shell wall portion 82.

The inflation fluid container 30 is disposed in the housing 40. The container 30 is secured in the housing 40 by being clamped or captured between the outer shell 44 and the inner shell 46. Rubber cushions 90 and 92 shaped as parts of a sphere are preferably placed between the container 30 and the housing 40 and clampingly engage the container 30.

Figure 6:
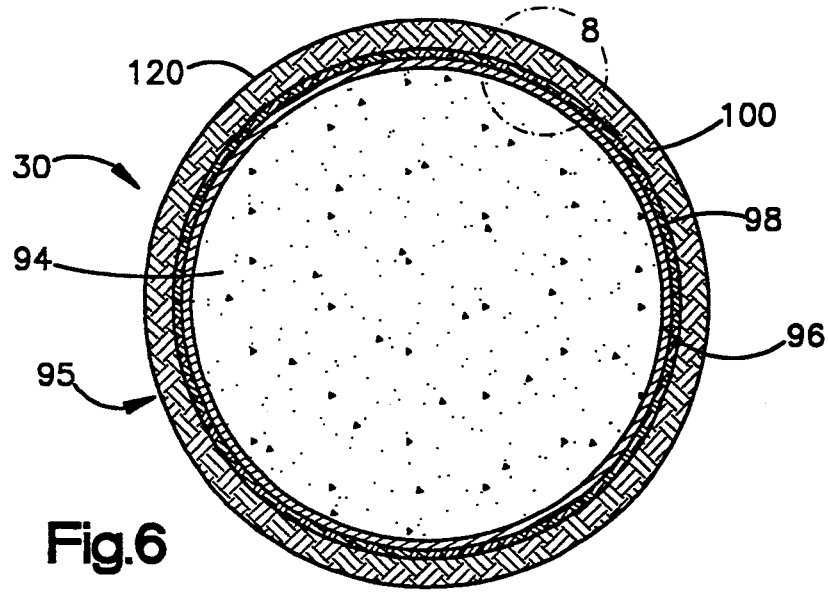
FIG. 6 is a sectional view taken along line 6—6 of FIG. 5.
Figure 7:
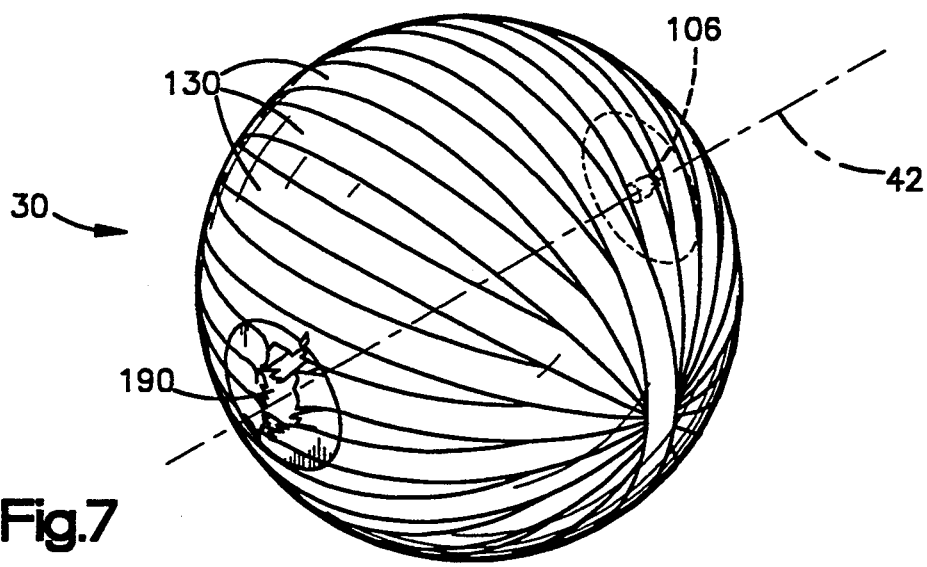
FIG. 7 is a view similar to FIG. 5 and showing the container in an opened condition.

The container 30 (FIGS. 5-10) is generally spherical in configuration. The container 30 encloses an inflation fluid, which is preferably a gas 94 (FIG. 6), under pressure for inflating the air bag 32. The gas 94 is stored in the container 30 at a pressure in the range of between 500 psi and 10,000 psi. The gas 94 may be any known gas or mixture of gases suitable for inflating the air bag 32. One preferred gas is nitrogen.

Figure 8:
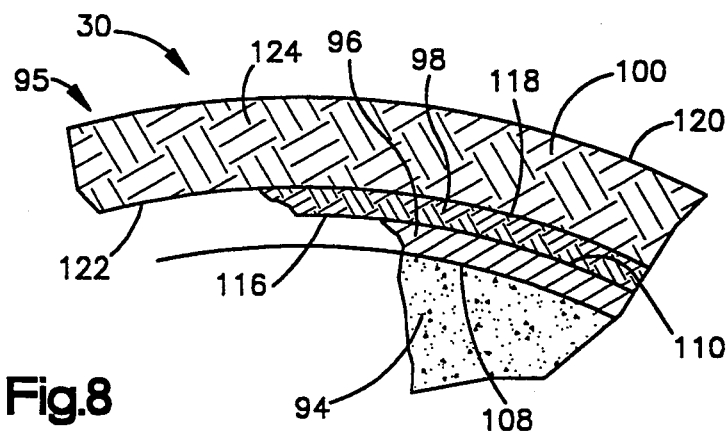
FIG. 8 is an enlarged fragmentary sectional view of a portion of the wall of the container of FIG. 6.

The container 30 includes a container wall 95 (FIG. 8). The container wall 95 is made from a plurality of layers of different materials. The layers of the container wall 95 include a liner 96, a galvanic shield 98, and a composite material 100.

The liner 96 is the innermost layer of the container wall 95. The liner 96 is made from a nonporous material and blocks leakage of stored gas out of the container 30. The liner 96 is preferably made from aluminum about 0.060 inches thick, but may be made of a different metal or of plastic.

The liner 96 is generally spherical in shape and may be made from two hemispherical portions welded together. The liner 96 has an inner surface 108 and an outer surface 110. The liner 96 has a flat axial end portion 102 (FIG. 3) facing toward the left end 54, as viewed in FIG. 3, of the module 10. The liner 96 also has a flat opposite axial end portion 104. A small gas fill stem 106 (shogun exaggerated in size in FIG. 3) is secured, as by welding, to the liner end portion 104.

The galvanic shield 98 overlies the liner 96. An inner surface 116 of the galvanic shield overlies the outer surface 110 of the liner 96, while an outer surface 118 of the galvanic shield is presented away from the liner. The galvanic shield 98 is preferably a thin layer of glass fiber adhered to the liner 96 by a suitable adhesive. The adhesive could be the matrix material 124 described below with reference to the composite material 100. The galvanic shield 98 electrically insulates the metal liner 96 from electrically conductive carbon fibers which, as described below, are present in the composite material 100. The galvanic shield 98 thus prevents contact of dissimilar materials which might lead to corrosion of the liner 96.

The composite material 100 forms the outermost layer of the container 30. The composite material 100 is a porous but extremely strong material and prevents the pressure of the stored gas from rupturing the liner 96 and the galvanic shield 98. The composite material 100 has an outer surface 120 and has an inner surface 122 overlying the outer surface 118 of the galvanic shield 98. The composite material 100 includes a matrix material 124 and a reinforcing material disposed or en%bedded in the matrix material.

The matrix material 124 is preferably an anhydride epoxy heat cured resin such as Brunswick LFR-092 which may be obtained from Brunswick Corporation Composites Group of Lincoln, Nebr. The matrix material 124 has a low viscosity and a short cure time suitable for resin transfer molding. The matrix material 124 has a tensile strength of 12 kpsi, a tensile modulus of 490 kpsi, and a density of 0.04 pounds per cubic inch. Another suitable matrix material is a thermoset vinyl ester resin sold by the Dow Chemical Company and having similar specifications.

The reinforcing material of the composite material 100 includes a plurality of fiber bands 130. The bands 130 are shaped like ribbons having a width of about 0.125" to 0.200" and a thickness of about 0.015" to about 0.020". Each band 130 is a long bundle of glass and carbon fibers which run the length of the band. The bands preferably include 40% by weight glass fibers and 60% by weight carbon fibers.

A preferred carbon fiber is a polyacrylonitrile (PAN)-derived carbon fiber, which may be obtained from BASF Company of Parsippany, N.J., having a 550 kpsi tensile strength, a 34-Mpsi tensile modulus, and a density of 0.063 pounds per cubic inch. Another preferred carbon fiber material may be obtained from Amoco Products of Alpharetta, Ga., as number T-650-35. A preferred glass fiber material is E-Glass which may be obtained from Owens-Corning Corporation of Toledo, Ohio.

A preimpregnation process is preferably used on the bands 130. In the preimpregnation process, the bands 130 are sprayed or dipped in a bath of the matrix material 124 to form a prepreg. If the prepreg is not immediately used to make the container 30, the prepreg is refrigerated to delay curing.

After the galvanic shield 98 is placed over the liner 6, the bands 130 are dipped in a bath of the matrix material 124 and wrapped over the galvanic shield to form the composite material 100 in an uncured state. The bands 130 are wrapped to cover the entire outer surface of the container 30 except for the fill stem 106. Up to twelve to fifteen or more layers of bands 130 are used. The container 30 is then heated to cure the matrix material 124 to complete formation of the composite material 100. The container 30 is then filled with gas through the fill stem 106 which is closed by crimping and/or welding.

Figure 9:
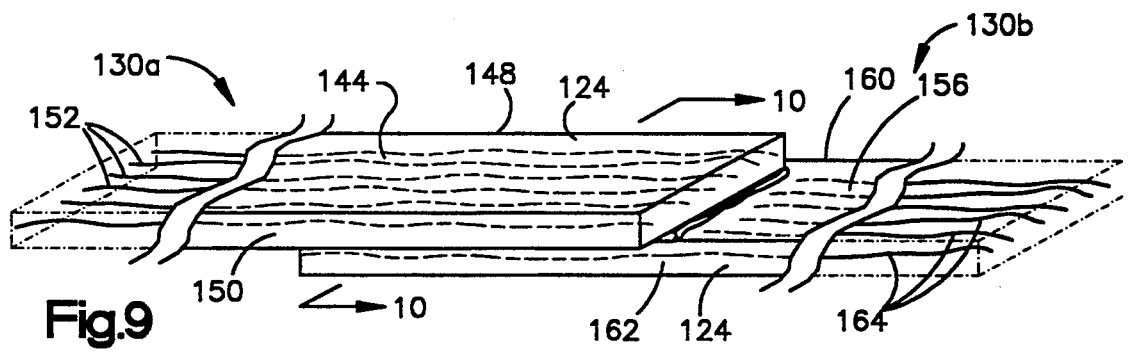
FIG. 9 is a schematic view illustrating a portion of the composite material of the container wall.
Figure 10:
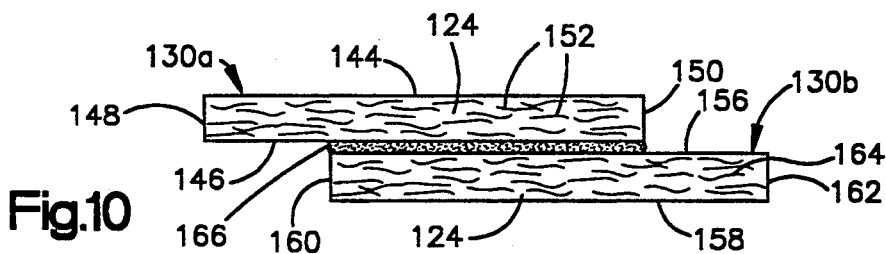
FIG. 10 is a schematic sectional view taken along line 10—10 of FIG. 9.

FIGS. 9 and 10 illustrate schematically a portion of the composite material 100 including two exemplary bands 130a and 130b. The band 130a has a generally rectangular ribbon-like configuration with upper and lower surfaces 144 and 146 and side surfaces 148 and 150. The band 130a includes a plurality of reinforcing carbon and glass fibers indicated schematically at 152 running along the length of the band. Matrix material 124 is disposed between and among the fibers 152 of the band 130a.

The band 130a overlies the band 130b. The band 130b has upper and lower surfaces 156 and 158 and side surfaces 160 and 162. The band 130b includes a plurality of reinforcing carbon and glass fibers 164 running along the length of the band. Matrix material 124 is disposed between and surrounding the fibers 164. A layer 166 of matrix material 124 is disposed between the band 130a and the band 130b. In the completed container 30, the matrix material 124 flows between and covers all of the various glass and carbon fibers of all of the bands 130, to form the composite material 100.

The module 10 (FIG. 3) includes a detonator 180 disposed at the axial end portion 102 of the container 30. The detonator 180 may be any known detonator suitable for rupturing the wall of the container 30. The detonator 180 is located on the axis 42 intermediate the container 30 and the opening 76 of the housing 40. A support structure 182 secured to the housing 40 holds the detonator 180 against the container 30. The lead wires 26 extend from the detonator 180 and are suitably connected with the lead wires 24 (FIG. 2).

In the event of a side impact of a predetermined magnitude to the vehicle 14, the sensor 20 and the computer 22 direct an electrical actuating signal through the lead wires 26 to the detonator 180. The detonator 180, when actuated, makes an opening 190 (FIGS. 7 and 11) in the container 30 by rupturing the wall 95 of the container. Gas 94 flows out of the container 30 through the opening 190 in a direction as indicated by the arrow 194 (FIG. 3). The walls of the housing 40 direct the flowing gas 94 out of the chamber 72 through the opening 76 and into the air bag 32, to inflate the air bag as shown schematically in FIGS. 1 and 2.

When the detonator 180 is actuated, it breaks into pieces, some of which are carried by the flowing gas 94 in the direction 194. Many pieces of the detonator travel past the opening 76 into the inertial particle trap 80 and remain in the inertial particle trap.

When the container 130 is opened by the detonator 180, the detonator ruptures the composite material 100, the galvanic shield 98, and the liner 96. Thus, a portion of the container wall 95 is broken away into fragments to form the opening 190. These pieces of the container wall 95 include fragments of the liner 96 which are created when the liner is ruptured.

Some of these container wall fragments may separate from the container 30 and be carried by the flowing gas 94 in the direction 194. Many container wall fragments travel past the opening 76 into the inertial particle trap 80 and remain in the inertial trap.

The composite material 100 prevents other fragments of the container wall 95 from separating from the container 30. The matrix material 124 is adhesive in nature. The matrix material 124 adheres to pieces of the container wall 95 and to the fibers in the composite material 100. When fragments of the container wall 95 are urged by the flowing gas 94 to move with the gas, the fragments which are adhered to the fibers by the matrix material are held on the container by the fibers and the matrix material.

Figure 11:
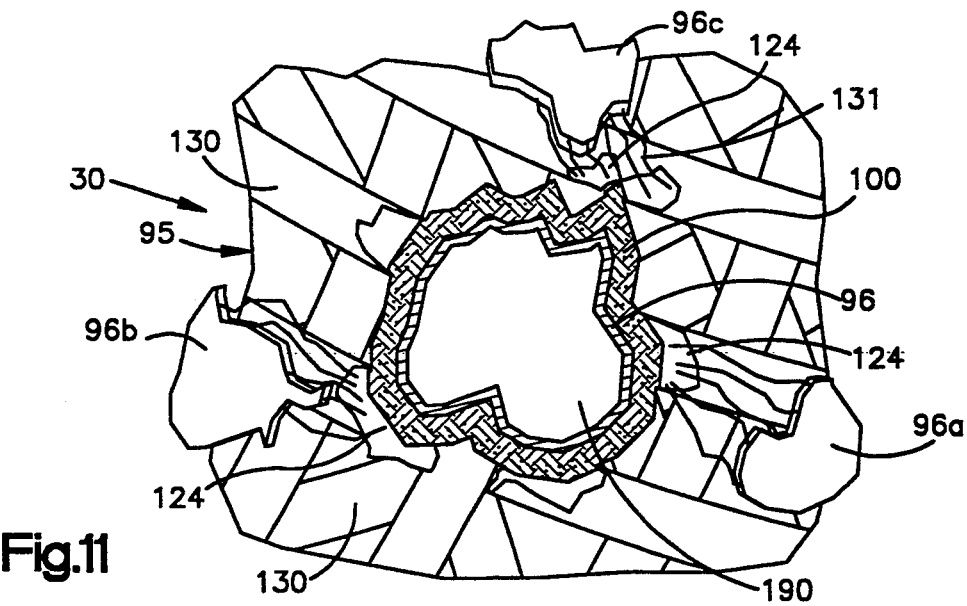
FIG. 11 is a schematic view illustrating a portion of the container in an opened condition.

Thus, as illustrated schematically in FIG. 11, the matrix material 124 adheres to the fibers 131 of the composite material 100 and also adheres to broken off fragments 96a, 96b and 96c of the liner 96. (The galvanic shield 98 is not shown in FIG. 11.) Fibers 131 and portions of the matrix material 124 extend between the liner fragments 96a, 96b and 96c and the remaining unbroken part of the container wall 95. The composite material 100 including the matrix material 124 thus inhibits separation, from the container 30, of pieces of the container including fragments of the liner 96. Thus, a filter is not needed in the gas flow path between the container 30 and the air bag 32.

FIG. 12 illustrates schematically an air bag inflator assembly 200 in accordance with a second embodiment of the invention. In the second embodiment of the invention, an inflation fluid container is ruptured by a housing portion in response to crushing of the door of the vehicle.

The inflator 200 includes an inflation fluid container 202 which is similar in construction to the inflation fluid container 30 of FIGS. 1–11. The container 202 is disposed in an inflation fluid chamber 204 defined by a housing a portion of which is shown at 206. The housing 206 includes a wall portion 208 adjacent to and extending generally parallel to a portion 210 of the door of the vehicle. A V-shaped portion 212 of the housing 206 projects inwardly from the wall portion 208 into abutting engagement with the container 202.

Upon the occurrence of a side impact to the vehicle of sufficient magnitude, the vehicle door portion 210 deforms or moves inwardly toward the inflator 200 in a direction as indicated by the arrow 214. The door portion 210 engages the housing wall portion 208 and deforms or moves it inwardly toward the container 202 in the direction 214. The projecting portion 212 is driven into the container 202. The projecting portion 212 penetrates the container 202, rupturing the container and releasing the inflation fluid from the container into the chamber 204. The inflation fluid is directed into an air bag 216 to restrain movement of the vehicle occupant. Because the container 202 is of the same construction as the container 30 in the first embodiment, the composite material of the container 202 inhibits separation of fragments of the container upon rupturing of the container.

FIG. 13 illustrates schematically an air bag inflator assembly 300 in accordance with a third embodiment of the invention. In the third embodiment of the invention, which is generally similar to the second embodiment, an inflation fluid container is ruptured by sharp member attached to a housing portion in response to crushing of the door of the vehicle.

The inflator assembly 300 includes an inflation fluid container 302 which is similar in construction to the inflation fluid container 30 of FIGS. 1–11. The container 302 is disposed in an inflation fluid cheer 304 defined by a housing a portion of which is shown at 306. The housing 306 includes a wall portion 308 adjacent to and extending generally parallel to a portion 310 of the door of the vehicle. A V-shaped member 312 having a sharp point 14 is attached to and projects inwardly from the wall portion 308 into abutting engagement with the container 302.

Upon the occurrence of a side impact to the vehicle of sufficient magnitude, the vehicle door portion 310 deforms or moves inwardly toward the inflator assembly 300 in a direction as indicated by the arrow 316. The door portion 310 engages the housing wall portion 308 and moves it inwardly toward the container 302 in the direction 316. The sharp point 314 of the member 312 is driven into the container 302. The member 312 penetrates the container 302, rupturing the container and releasing the inflation fluid from the container into the chamber 304. The inflation fluid is directed into an air bag 318 to restrain movement of the vehicle occupant. Because the container 302 is of the same construction as the container 30 in the first embodiment, the composite material of the container 302 inhibits separation of fragments of the container upon rupturing of the container.

It should be noted that the present invention relates to vehicle occupant restraint apparatus other than side impact modules. For example, the present invention may be used in association with air bags located in a steering wheel or a dashboard (instrument panel) of a vehicle.

From the above description of the invention, those skilled in the art will perceive improvements, changes and modifications in the invention. Such improvements, changes and modifications within the skill of the art are intended to be covered by the appended claims.

We claim:

1. An apparatus for inflating a vehicle occupant restraint such as an air bag, said apparatus comprising:
    containing means for containing an inflation fluid under pressure, said containing means comprising a liner and a composite material encasing said liner;
    an inflation fluid under pressure in said containing means for, when released from said containing means, inflating the vehicle occupant restraint;
    directing means for directing said inflation fluid, when released from said containing means, to the vehicle occupant restraint to inflate the vehicle occupant restraint; and
    opener means for opening said containing means by rupturing said composite material and said liner to release said inflation fluid from said containing means, said opener means producing liner fragments;
    said composite material comprising means for inhibiting separation of the liner fragments from said containing means.

2. An apparatus as set forth in claim 1 further comprising an inflatable vehicle occupant restraint connected with said directing means, said directing means defining an inflation fluid flow path between said containing means and said inflatable vehicle occupant restraint, said inflation fluid flow path being free of filter material.

3. An apparatus as set forth in claim 1 wherein said composite material comprises a matrix material and a plurality of reinforcing fibers in said matrix material, said means for inhibiting separation of the liner fragments from said containing means comprising said matrix material, said liner fragments adhering to said matrix material upon rupturing of said liner by said opener means.

4. An apparatus as set forth in claim 3 wherein said matrix material comprises an anhydride epoxy heat cured resin and said reinforcing fibers comprise glass fibers and carbon fibers.

5. An apparatus as set forth in claim 3 wherein said liner is made of metal.

6. An apparatus as set forth in claim 1 wherein said directing means comprises a housing in which said containing means is disposed, said housing having surfaces defining an opening for directing the flow of inflation fluid out of said housing to the vehicle occupant restraint, said housing having an end portion including surfaces defining a particle trap, said opening being disposed intermediate said containing means and said particle trap.

7. An apparatus as set forth in claim 1 wherein said liner is non-porous and said composite material is porous, the pressure of said inflation fluid in said containing means being in the range of from about 500 psi to about 10,000 psi.

8. An apparatus as set forth in claim 1 wherein said opener means comprises a detonator disposed adjacent to a wall of said containing means, said apparatus including support means for supporting said detonator adjacent to said wall of said containing means.

9. An apparatus as set forth in claim 1 wherein said container is generally spherical in shape, said liner comprising a metal member having a generally spherical shape and said composite material comprising a plurality of bands of reinforcing fibers overlying said liner.

10. An apparatus as set forth in claim 1 for use in inflating a vehicle occupant restraint such as an air bag mounted in a door of a vehicle, wherein said opener means comprises means for rupturing said composite material in response to movement of a portion of the door of the vehicle upon the occurrence of a side impact to the vehicle.

11. An apparatus as set forth in claim 10 wherein said means for rupturing comprises a housing within which said container is disposed, said housing having a wall portion disposed adjacent to the vehicle door portion, said housing wall portion moving with said vehicle door portion to penetrate into and rupture said composite material.

12. An apparatus as set forth in claim 10 wherein said means for rupturing comprises a housing within which said container is disposed, said housing having a wall portion disposed adjacent to the vehicle door portion, said means for rupturing comprising a member attached to said housing wall portion and moving with said housing wall portion and with said vehicle door portion to penetrate into and rupture said composite material.

13. A method of inflating a vehicle occupant restraint such as an air bag, said method comprising the steps of:
    providing an inflation fluid under pressure in a chamber defined by a container including a liner encased by a composite material;
    opening the container by rupturing the composite material and the liner to release the inflation fluid from the container, said opening step producing liner fragments;
    inhibiting separation of the liner fragments from the container; and
    directing the flow of inflation fluid from the container into the vehicle occupant restraint to inflate the vehicle occupant restraint.

14. A method as set forth in claim 13 wherein the composite material comprises a matrix material and a plurality of reinforcing fibers in said matrix material, and wherein said step of inhibiting separation of the liner fragments from the container includes holding the liner fragments onto the container by the reinforcing fibers and the matrix material.

15. A method as set forth in claim 13 wherein said directing step includes directing the flow of inflation fluid through a chamber in a housing in which the container is disposed and out of the chamber through an opening in the housing, the opening being disposed intermediate the container and a particle trap portion of the housing, said method further comprising the step of capturing pieces of the ruptured liner in the particle trap portion of the housing.

16. A method as set forth in claim 13 wherein said step of opening the container includes actuating a detonator disposed adjacent to a wall portion of the container, breaking away a part of the wall portion of the container, and thereby forming an opening in the container wall portion.

17. A method as set forth in claim 13 wherein said step of providing an inflation fluid under pressure in a chamber of a liner encased by a composite material includes the steps of providing a container having a non-porous liner and a composite material encasing the porous liner, and filling the container with gas at a pressure in the range of from about 500 psi to about 10,000 psi.

18. A method as set forth in claim 13 wherein said step of opening the container includes
 moving a vehicle door portion toward the container upon the occurrence of a side impact to the vehicle,
 moving a housing wall portion disposed intermediate the vehicle door portion and the container toward the container, in response to movement of the vehicle door portion toward the container; and
 penetrating the composite material with the moving housing wall portion to rupture the composite material.

19. A method as set forth in claim 13 wherein said step of opening the container includes
 moving a vehicle door portion toward the container upon the occurrence of a side impact to the vehicle,
 moving toward the container a member connected with a housing wall portion disposed intermediate the vehicle door portion and the container, in response to movement of the vehicle door portion toward the container; and
 penetrating the composite material with the moving member to rupture the composite material.

* * * * *